United States Patent [19]
Fomukong et al.

[11] Patent Number: 5,918,159
[45] Date of Patent: Jun. 29, 1999

[54] LOCATION REPORTING SATELLITE PAGING SYSTEM WITH OPTIONAL BLOCKING OF LOCATION REPORTING

[76] Inventors: Mundi Fomukong, 10853 Rose Ave.,#49, West Los Angeles, Calif. 90034; Denzil Chesney, 57 Ozone Ave., Los Angeles, Calif. 90291

[21] Appl. No.: 08/905,674

[22] Filed: Aug. 4, 1997

[51] Int. Cl.⁶ .................................................. H04Q 7/12
[52] U.S. Cl. ................. 455/38.1; 455/456; 455/12.1; 455/31.3; 340/825.44; 340/825.49; 340/825.54
[58] Field of Search ................................ 455/427, 428, 455/432, 433, 434, 440, 456, 457.8, 414, 38.1, 38.2, 38.4, 5, 31.2, 3, 227, 12.1, 13.1, 458, 459, 100; 342/357; 701/213; 340/825.44, 825.49, 825.36, 825.54

[56] References Cited

U.S. PATENT DOCUMENTS

| | | | |
|---|---|---|---|
| 5,126,733 | 6/1992 | Sagers et al. | 455/38.1 X |
| 5,422,813 | 6/1995 | Schuchman | 455/440 X |
| 5,506,886 | 4/1996 | Maine et al. | 455/12.1 X |
| 5,539,395 | 7/1996 | Buss et al. | 455/38.1 X |
| 5,568,153 | 10/1996 | Beliveau | 342/357 |

*Primary Examiner*—Wellington Chin
*Assistant Examiner*—Philip J. Sobutka

[57] ABSTRACT

A location reporting satellite paging communication system comprising space satellites, ground stations and a call receiver adapted to resolve a global position from signals transmitted from satellites and earth based communication means. The call receiver or callee in possession of the call receiver updates the paging network with a global position as requested by the paging network. A caller paging a subscriber or callee in possession of the call receiver may request the global location of the callee. The paging network could divulge or block such information from a caller depending on the requirements of the subscriber.

14 Claims, 4 Drawing Sheets

LOCATION REPORTING SATELLITE PAGING SYSTEM WITH OPTIONAL BLOCKING OF LOCATION REPORTING

TECHNICAL FIELD OF THE INVENTION

This invention relates to paging telecommunication services and systems, specifically to such services and systems that employ satellites.

BACKGROUND OF THE INVENTION

Today a subscriber to a paging network selects areas where they wish to receive their pages. Each time a subscriber's message is processed by the paging network, the message is transmitted to all the global areas pre-selected by the subscriber to receive pages. However if a subscriber elects to receive pages at any worldwide location, the cost of transmitting a page to the subscriber will be very expensive making this technique highly inefficient. For example, if a caller residing in the same geographical location or neighborhood as a subscriber pages the subscriber, the message will be transmitted globally even though the subscriber and the caller might be a couple of miles apart. Other paging systems have gone a little bit further by allowing a subscriber to periodically update the paging network with their current global position (active area) as the subscriber travels from one location to another. Each time a paging network processes a message for a subscriber, the current global position or active area of the call receiver is validated against the areas pre-selected by the subscriber to receive pages. If the active area is within the subscriber's pre-selected area to receive pages the message is transmitted to the subscriber. As the subscriber travels from city to city or continent to continent, there will clearly be a need to alert the subscriber when they are out of their pre-selected or active paging area. Therefore, the current global active area of the call receiver should be made available to a user or subscriber in possession of the call receiver such that the network could be updated with this information when the need arises. This can only be feasible if the call receiver or pager is equipped with adequate means to resolve its position at any worldwide location.

Today, unlike other mobile telecommunication devices such as cellular telephones, pagers are utilized by a greater cross section of the population since they are relatively inexpensive to acquire. To a family, friend or business, the benefits of such a paging system will be tremendous. Individuals sending paging messages will be able to request from the paging network the global location where the paging message was sent. This will enable a caller to know the worldwide location of a callee or subscriber in possession of the call receiver each time a paging message is sent. To the network provider, the cost of transmitting a message to a subscriber will be reduced as pages will be targeted to specific global areas rather than using the conventional blind paging technique. A subscriber in possession of the call receiver will have the ability to obtain continuing global positioning information whenever necessary. A subscriber may allow callers sending a message to obtain positioning information from the network that will reveal the global position or location of the call receiver in certain instances while blocking such information from being divulged to callers in other instances. In an emergency situation the paging network could provide information regarding the global location of a distressed subscriber in possession of the call receiver.

SUMMARY OF THE INVENTION

This invention will provide a call receiver or pager with means to receive, store, and replay voice and alphanumeric messages transmitted from satellites and earth based communication means.

This invention will provide a call receiver with means to resolve a global position (latitude, longitude) from signals transmitted from satellites and earth based communication means.

This invention will provide an effective means to allow a subscriber to prevent their global position from being divulged to a caller or callers at certain instances, while allowing such information to be divulged at other instances.

This invention will provide a means to alert a user in possession of the call receiver or pager each time they are out of their pre-selected or current active paging area.

This invention will provide an efficient means to update the paging network, the current global position of the call receiver.

This invention will provide an efficient means for a call receiver, to concurrently process positioning and paging messages transmitted from satellites and earth based communication means.

THE PRESENT SYSTEM

Figure 1:
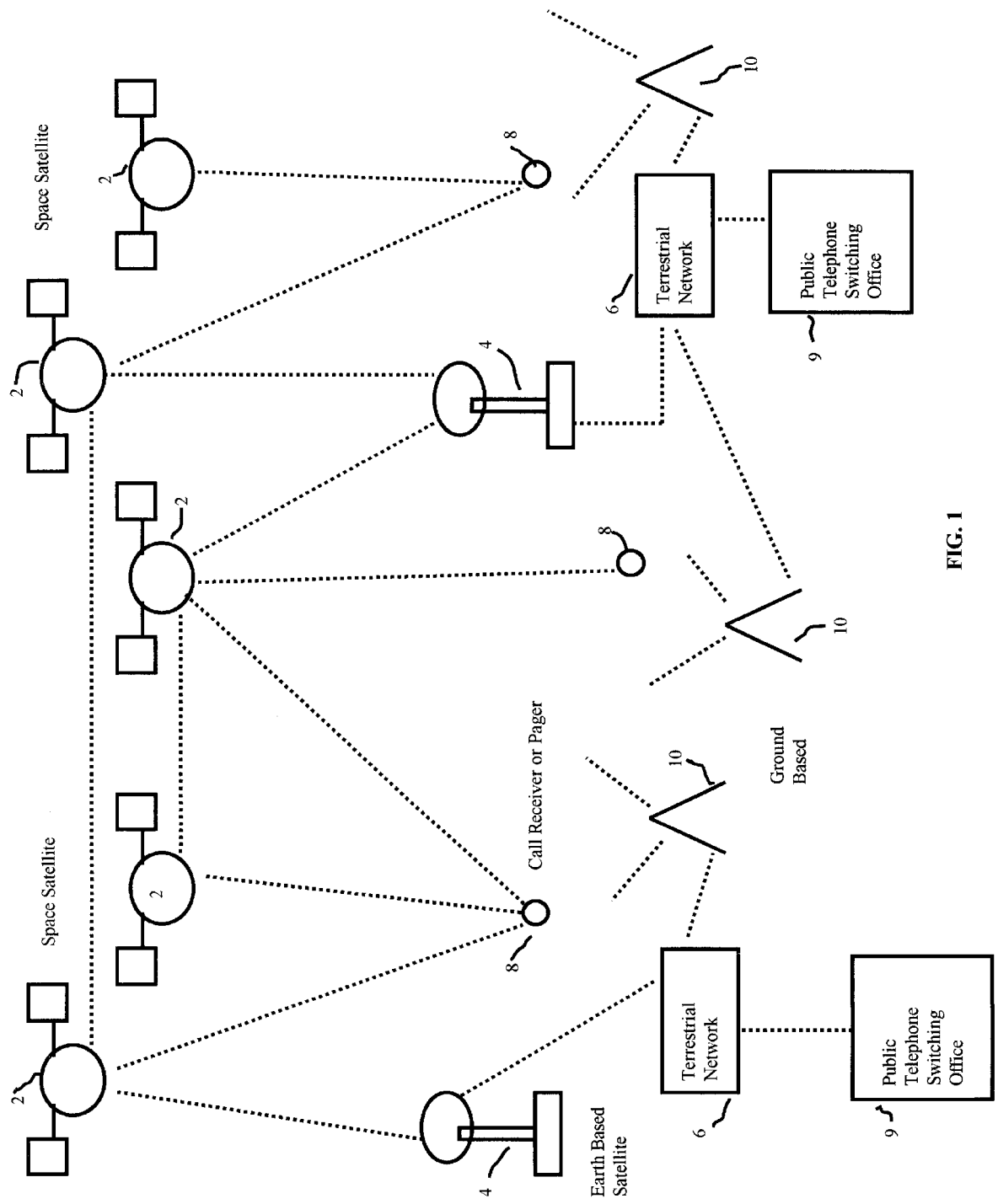
FIG. 1 shows the global satellite paging network in accordance with the present invention.

The present system will consist of satellites in space [2], communicating with earth based stations [4] and the call receiver or pager [8]. Ground based transmitters [10] will be employed to transmit pages to the call receiver [8]. Terrestrial network control stations [6], will be employed to effectively control the activities of the entire global paging network. The system will be developed such that a call receiver or pager operating under an existing paging systems will work.

Upon subscribing to a paging network a subscriber selects global areas (pre-selected paging areas) where they wish to receive paging messages. The pre-selected areas, pager ID, paging protocol and other relevant information of the call receiver are stored in the data library of a paging control station [6] for all pagers utilizing the paging network. A call receiver [8], will periodically resolve a global position from signals transmitted from satellites and earth based communication means. The resolved global position will be periodically utilized to update the network each time a user is out of their paging area or each time the paging network requests a call receiver to disclose their global position. This will enable the paging network to know the exact global location of a call receiver whenever the need arises. Messages received for a call receiver are processed by the network and transmitted to the global or active area of the call receiver.

To initiate a page, a caller may use any regular communication device such as a telephone to access the paging network. The caller may add specific codes to a paging message to enable the paging network to disclose the call receiver's global position after the message is transmitted. The caller's message is firstly processed by the local telephone switching office [9] before transmission to the paging control station [6]. The paging control station [6] will be employed to control all the activities of the network. Upon receiving a paging message, a paging control station decodes the message for relevant information such as pager ID and determines if a caller requires the global position of the pager. Other relevant information such as the paging protocol of the call receiver, pre-selected or preferred worldwide areas to receive pages and the current active area of the call receiver are retrieved from the paging control station's data library. The paging control station [6] validates the current active area of the call receiver with the call receiver's pre-selected areas to receive pages. If the call receiver's current active area is valid and within a pre-defined time interval the message is transmitted to the call receiver. If the current active area is invalid (call receiver is out of pre-selected paging area) the message is not transmitted to the callee and the caller is notified. In instances where the current active area of the call receiver is valid but the call receiver has not updated the network with its current position over a pre-defined time period, the paging control station will encode the message such that a request will be placed for the call receiver to update its current active global position. As each subscriber of the paging network can only travel a limited distance by air, land or sea within a pre-defined time interval; the paging network, based upon when a call receiver last updated their global location will select appropriate earth based stations and space satellites to transmit the message to the call receiver at specified worldwide locations. The call receiver upon receiving this signal will disclose their global location.

As a user travels from city to city or country to country, the call receiver will periodically resolve a global position from signals transmitted from satellites and earth based communication means. This information will be utilized by the call receiver or user in possession of the call receiver to update the current active area held by the paging network for that call receiver. Also, the call receiver will store this information in its memory such that future resolved global positions could be validated against this information to ensure that the active area currently held and utilized by the paging network to transmit pages to the call receiver is not outdated.

Once a control station determines where a message will be sent, the control station determines the best possible way to transmit the message. With a knowledge of the geographical distribution of all earth based satellite transmitters [4], ground base transmitter stations [10] and space satellites [2], the paging control station [6] will encode a message such that the sequence of transmission of the message will be included. The ID of all the ground stations or space satellites that will be employed in the message transmission chain will be encoded in a chronological order and the message will be routed to the first ground station. This station could be an earth station that transmits directly to satellite [4], or a ground based transmitter [10]. For example, after a paging control station encodes a message and determines which stations (earth or satellite) should transmit the message, the message is routed to the first earth station. The first earth station could either transmit the message directly to satellite or beam the message to their coverage area. Subsequent stations that receive the message decode the message and determine if other stations are required to transmit the message. If other stations are required to transmit the message the current station re-encodes the message so as to eliminate itself from the message transmission chain before retransmitting the message to the next station. By re-encoding the message an earth station or satellite station will prevent subsequent stations involved in the message transmission chain to retransmit the message back to that station. If an earth station or satellite determines it is required to broadcast a message, the message is beamed to the area covered by that station. The transmission chain continues until the last station broadcasts the message and acknowledges with a status signal which is sent back to the paging control station. Upon receiving this signal, the ground control station can alert the caller that the message was successfully sent. Therefore, with a knowledge of the geographical distribution of the paging network's earth and satellite transmitters, and a knowledge of the current active area of a call receiver, a ground control paging station could effectively encode a caller's message to include all satellite and earth based stations that will be employed in the message transmission chain. This will eventually minimize the risk of a satellite or earth based transmitter from being overloaded.

Once a paging control station [6] receives a message from a caller, the control station, determines if the caller requested the global position of the call receiver. The control station then verifies from its data library if the positioning disclosure feature for that call receiver or pager has not been blocked by the subscriber. Each call receiver will have a special code whereby if identified in a caller's paging information, will allow the paging control station to disclose the call receiver's global position. If such a code is not detected in a callers message and the caller requested the global location of a callee in possession of the call receiver, the caller will be immediately notified that their request was not authorized by the subscriber or callee. A subscriber may change their positioning disclosure code at anytime and reveal such information only to individuals who could acquire information regarding their global whereabouts from the paging network. The paging network will only override the users request and disclose a subscribers global position only in an emergency circumstance.

Figure 3:
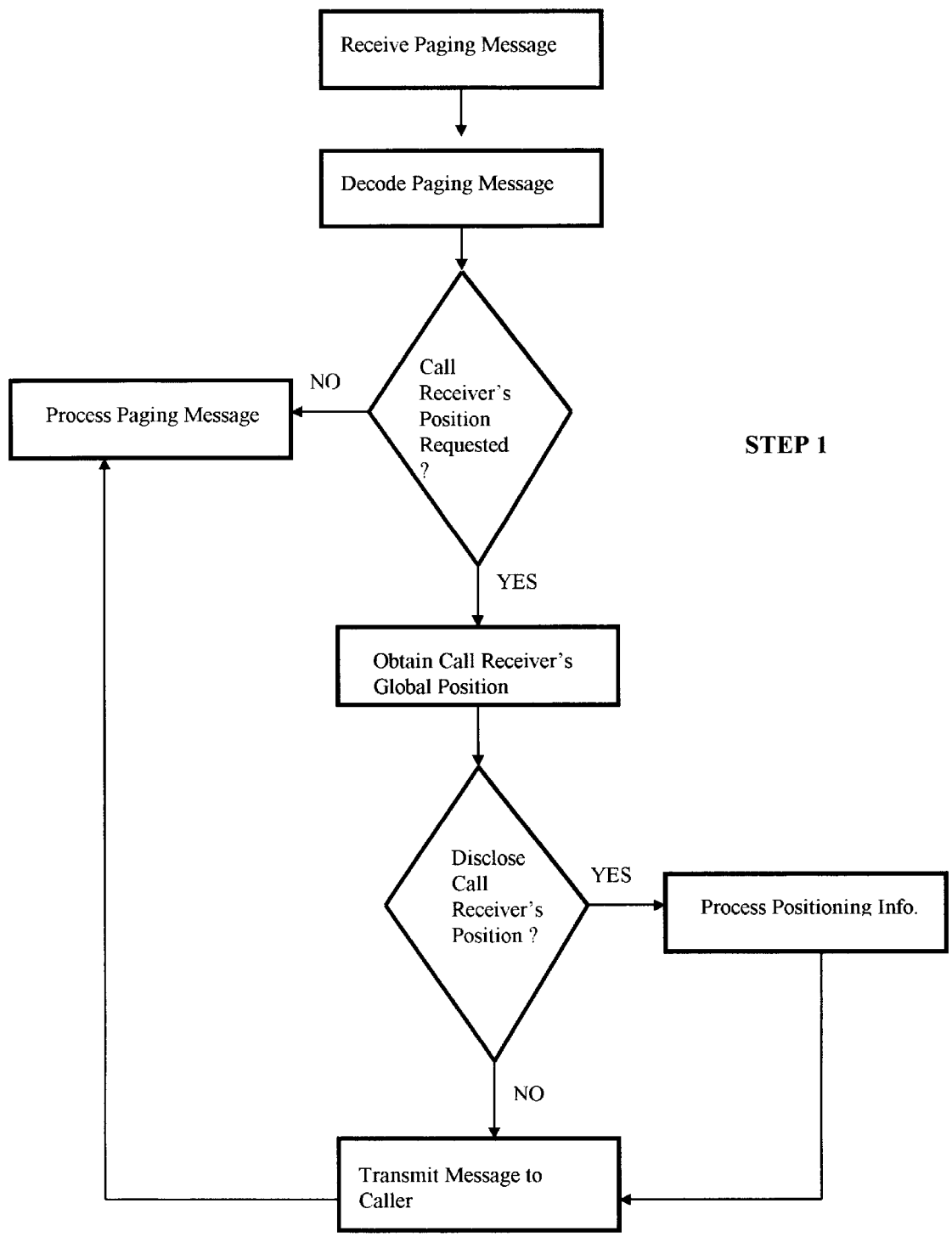
FIG. 3 shows a flow chart illustrating the operation of a paging network control station each time a caller request for the global position of a call receiver.

If the positioning disclosure feature is blocked for any call, a message is sent to the caller indicating that the subscriber does not wish their current global position disclosed. If the positioning disclosure feature is active, the control station retrieves the coordinates of the call receiver's global position and encodes that information before transmission to the caller. Such information may describe the latitude and longitude of the subscriber including a more simplified information such as the country, city or town were the message was sent. The steps carried out by the control station during this process are best illustrated in step 1, FIG. 3. In this illustration, the paging control station upon receiving a paging message decodes the message and checks if the message includes a request for the call receiver's global position. If such information is not required the message is processed normally. If the call receiver's global position is required and the positioning disclosure code is detected, the call receiver's positioning information is retrieved from the data bank of the paging control station. If the information retrieved from the paging control station's databank is unavailable or out of date, a request could be made that the call receiver's disclose its current position. If the control station establishes that the positioning disclosure feature is blocked for that message, the caller is immediately notified with the appropriate message. If the call receiver's positioning disclosure feature for the message in process is active, the positioning information of the call receiver is processed and transmitted to the caller and the caller's message is processed for dispatch to the call receiver as previously disclosed.

For global positioning, the call receiver will be pre-programmed to periodically resolve a position from signals transmitted from satellites and earth based communication means. Some of the satellites and earth based transmitters used to transmit paging information could be employed to transmit referenced positioning signals to the call receivers. Alternatively the Global Positioning System well known in the art as GPS could also be utilized by the call receiver to resolve a global position. However the call receiver should have a means to resolve a global position from L-band signals transmitted from at least one satellite, depending on the resolving technique employed. GPS is currently being used to provide worldwide positioning information to mobile users around the globe. Such positioning information has an accuracy of about one hundred meters and could further be improved to an accuracy of five meters if referenced signals from ground based transmitters are utilized in the resolving process. A fully operational Global Positioning System includes up to 24 satellites dispersed around six circular orbits. The dispersion and inclination of the satellites is such that at least three or more satellites are readily visible from most parts on the earth surface. In a typical example, for a call receiver to resolve a global position, the call receiver need to solve for two variables of position, latitude and longitude. The satellites, equipped with atomic clocks act as a beacon and transmit signals that tell the call receiver where it is and what time the signal was sent. From this information, a call receiver can determine how far it is from the satellite by comparing the time sent with the time received and multiplying by the speed of light (distance= velocity * time). Since there is a bias between the GPS time and the user's time, a third variable time will be required. Having three satellites in view at any point in time, a call receiver will be able to solve for latitude, longitude and time. For three dimensional positioning a fourth variable and satellite will be required. Upon resolving a global position the call receiver or pager could update the network with its present global location or the call receiver could alert a user when they are out of their active or preselected global areas to receive pages.

THE CALL RECEIVER OR PAGER

Figure 2:
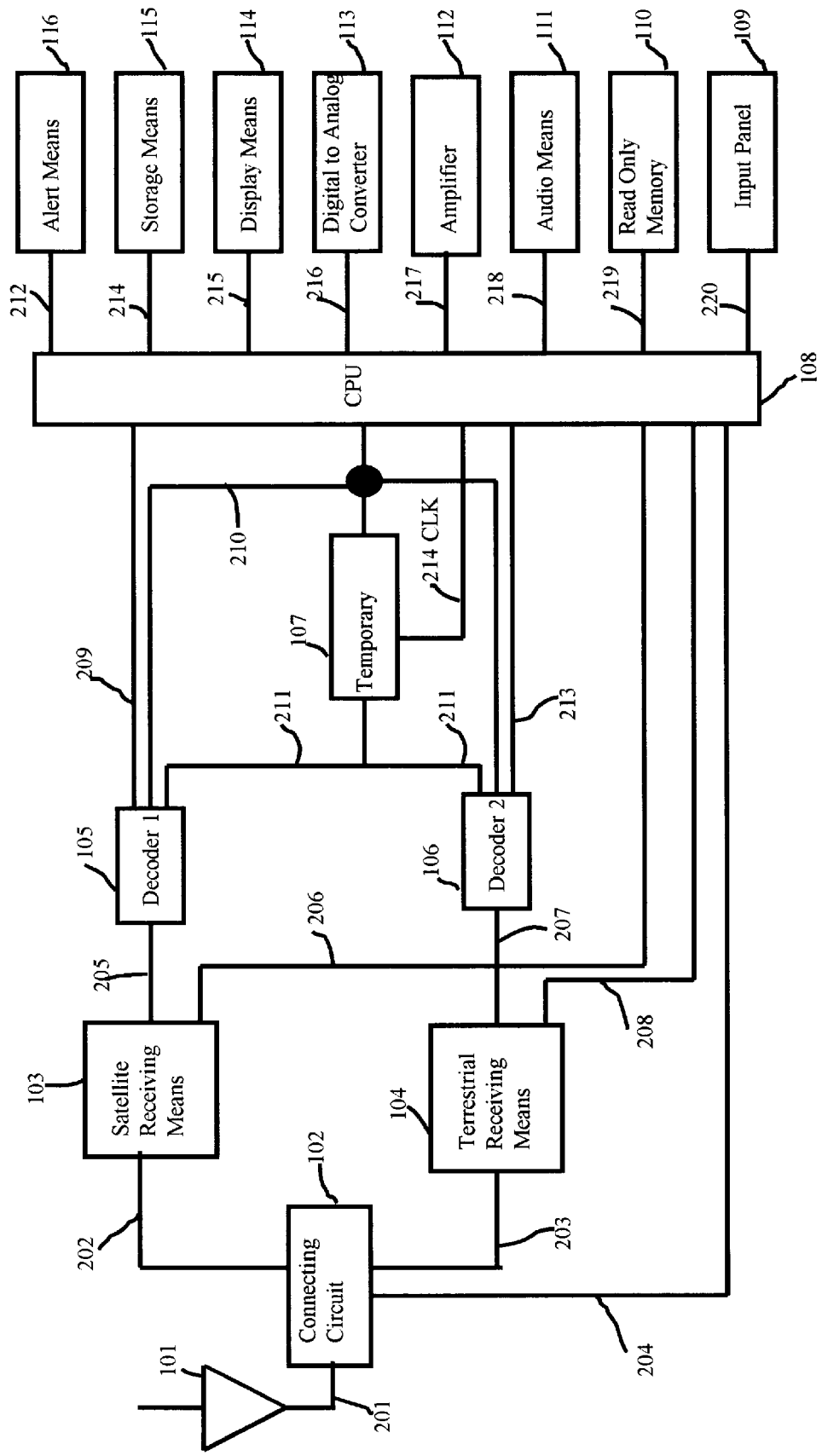
FIG. 2 shows a block diagram of the call receiver or pager in accordance with the present invention.

The call receiver (FIG. 2) will receive messages transmitted from satellites and terrestrial based transmitters through the transceiver [101]. The connecting circuitry [102] of the call receiver, controlled by the CPU [108], will route satellite based signals via 202 to the satellite receiving means [103] and terrestrial based signals via 203 to the terrestrial receiving means [104]. The connecting circuitry may include a filter arrangement and a switch that will allow L-band or satellite frequencies to pass via 202 and terrestrial or Ultra High Frequencies to pass via 203. This signals could either be paging message signals or global positioning signals. Therefore depending on the pre-loaded protocols and initialization data, the CPU will drive the connecting circuitry [102], satellite receiving means [103], terrestrial receiving means [104] to scan and process specific frequencies.

Satellite signals are processed by the satellite receiving means [103]. This unit will process global positioning satellite signals and satellite message signals. The satellite receiving unit will include satellite signal amplifiers, mixers and filters that will convert the L band global positioning and message signals received from the connecting circuit [102] to an appropriate level for efficient processing by the decoding circuit [105]. The satellite receiving means circuitry is well known by any one well skilled in the art. The operation of this unit is controlled by the microprocessor or CPU [108] via 206.

The CPU determines the appropriate intermediate frequencies and output signals that will be generated by the satellite receiving unit [103]. This is based on the initialization parameters pre-loaded in the ROM [110] of the call receiver. The CPU controls the satellite receiving unit via 206, and the output signals produced by the satellite receiving unit [103] are routed via 205 to the decoder [105] for intelligence extraction and error correction. Decoder [105] is controlled by the CPU [108] via 209. Transmission of data directly by Decoder [105] or Decoder [106] to the CPU input port via 210 is determined by the CPU. If the CPU determines satellite messages are of high priority Decoder [165] is signaled via 209 to transmit data directly to the CPU via 210 and Decoder [106] is signaled via 213 to temporary hold its data. Decoder [106] will store its data in the Temporary Store [107] via 211 for later retrieval by the CPU. If terrestrial based signals are of a higher priority Decoder [105] is signaled to temporary hold its data. Again each decoder could be equipped with a store eliminating the use of the Temporary Store [107]. If a decoder is not equipped with storage means, the decoder could download its data via 211 to the temporary data storage while the other decoder will transmit directly to the CPU via 210. If multiple decoders are required to decode multiple satellite and earth based signals (message and positioning signals), the CPU could again determine when each decoder should transmit it's data to the CPU's input port, with each decoder equipped with the appropriate storage means to temporarily hold it's data until such transmit instruction is received from the CPU.

Terrestrial based signals will be processed by the terrestrial receiving means [104]. This UHF or VHF signals will be routed by the connecting circuitry [102] via 203 to the terrestrial receiver [104]. Again, the terrestrial receiving unit will include Ultra High Frequency (UHF) or Very High Frequency (VHF) amplifiers, filters and down converting circuitry to process the signal from 203 to an appropriate level for efficient processing by decoder [106]. Direct transmission of data from decoder 2 [106] to the CPU via 210 will be controlled by the CPU. The operation of this part of the receiver will be similar to the satellite receiving end. Therefore, the CPU [108] will control the operation of the connecting circuitry, the satellite and terrestrial receiving means. The CPU [108] will have the ability to determine exactly when a satellite or terrestrial message or positioning signal is received and processed.

Once the CPU completes processing data from a decoder [106,107], the CPU retrieves data from the temporary data storage [107] for processing. As previously stated multiple decoders could be employed. In this situation each decoder will have the ability to store or hold its data temporarily or use the temporary storage [107] until signaled by the CPU to transmit data directly via 210. Relevant communication links will be added to interface the newly added decoders to the CPU [108], satellite receiving unit [103], and the terrestrial receiving unit [104]. With this technique all message and positioning signals transmitted from either satellite or earth based communication means will be eventually decoded and processed by the CPU, with rarely any message being lost or corrupted in this process.

To conserve receiver power, the CPU could be pre-programmed so as to control the connecting circuitry [102], the satellite receiving module [103], and the terrestrial receiving module [104], to process positioning signals periodically. In this situation only paging messages (voice and alphanumeric) will be allowed to pass, while positioning information signals will be periodically blocked. If a paging message received requires the call receiver to disclose its current global location, the CPU [108] upon detecting this request will allow the call receiver to resolve a global position from satellite and earth based referenced signals before resuming operation normally.

If a decoded message received by the CPU via 210 is voice or alphanumeric, the CPU alerts the user either through the display [114], alert means [116] or audio means [111] as to the presence of a new message. Alphanumeric messages are displayed through the display, while voice messages are routed to the digital to analog (D/A) converter [113], so that they are converted to their analog format by the D/A converter. The analog signal is amplified by the amplifier [112], and the amplified signal is used to drive the audio means [111] (speaker or earphone). The memory means [115] is used to store messages for future replay by the user. These messages are first compressed by the CPU before storage in memory. Prior to replay or redisplay the messages are decompressed.

Once a user subscribes to the global paging network, the call receiver is initialized. Relevant data such as the paging protocols, frequencies, preferred paging locations and other relevant data are down loaded into the ROM [110] of the call receiver. As the user travels from one global location to another, this information will be used by the CPU to control the actions of all modules of the call receiver.

Figure 4:
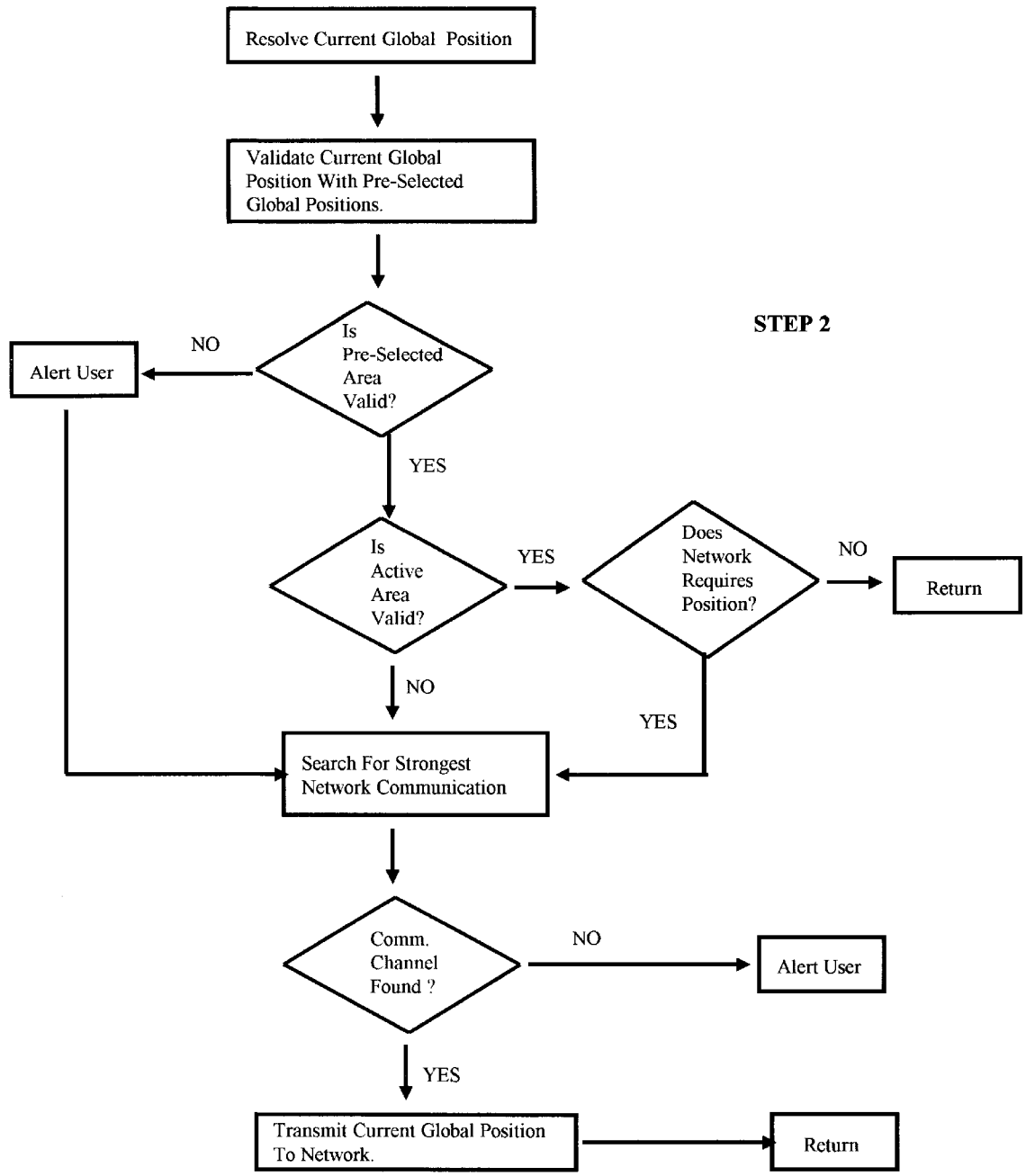
FIG. 4 is a flow chart illustrating the operation of a call receiver when a global position is resolved in an attempt to determine if the call receiver is out of their paging area.

A call receiver will have the ability to resolve a global position from signals transmitted from satellites and earth based communication means. Periodically, the call receiver will resolve a global position from these signals and compare it to reference encoded global position coordinates pre-loaded in its ROM [110]. If the CPU [108] establishes that the current global position of the call receiver is not within the user's preferred location to receive pages, the user is immediately alerted that they are out of their paging area and no paging messages will be received. If the call receiver's current active area to receive pages is not within the previously stored active areas, the user is alerted to update the paging network with their current active area. The network may also request the call receiver for its current global position. If such a message is received the callee or user in possession of the call receiver is notified that an update of the network is required. The call receiver will scan for the strongest network communicating channel via transceiver [101]. If such a link is established, the call receiver will automatically update the network with its current global positioning coordinates. In circumstances where the call receiver does not find a suitable network channel for direct communication, the call receiver will alert the user that no RF communicating channel was found for automatic update of its current global position. In this situation a user could update the network by calling in and disclosing their current global coordinates resolved by the call receiver. If the user is required to update the network, the call receiver will periodically alert the user to update the network until an input is received from the user through input panel [109] via 220 indicating that the action has taken place. The CPU [108] will store in its memory the current resolved global position of the call receiver as the current active area of the call receiver held by the paging network. This will enable the CPU to determine when an active area update of the paging network is required without waiting for the network to request for such information. The actions undertaken by the call receiver during this processes are best illustrated in Step 2, FIG. 4. In this illustration, the call receiver first resolves a global position. Such a request might have been initiated from the user through input panel [109], the paging network or from within the call receiver's CPU. Upon resolving a global position, the call receiver validates this position with the pre-selected areas to receive pages usually stored in the ROM. If the pre-selected areas are valid, the call receiver further checks if its current active area to receive pages is valid. If the call receiver's current active area to receive pages is valid, the CPU checks if the paging network requires the current global coordinates of the pager. If the network does not require the call receiver to update its position, the call receiver resumes operation normally. If the current active area of the call receiver is invalid or the pre-selected area to receive pages is invalid or the network had requested for the call receiver's global location, the call receiver searches for the strongest network communication channel to transmit its current global position. If such a channel is found the network is automatically updated. If no such channel is found the user is alerted to update the network with the current global coordinates resolved by the call receiver.

At any point in time a subscriber could use the call receiver or any relevant terrestrial communication device to activate or deactivate their positioning disclosure feature from the network. In the deactivated mode the network will not disclose a subscriber's global location to a caller requesting that information. A user may override the periodic global positioning resolving feature of the call receiver to obtain a current global position through the input panel [109] at any time. Once the CPU [108] resolves and makes this information available to the user, the terrestrial receiving means [104], satellite receiving means [103] and the connecting circuit [102] will be signaled to resume operation normally. With the aid of the input panel [109] and the display [114] relevant information such as current active paging area, pre-selected areas, and the call receiver's current global position will always be made available to a user such that an update of the paging network could be done by a user in possession of the call receiver at any point in time and at any global location without a request from the network.

We claim:

1. A satellite paging communication system with means to locate the global position of a of a call receiver unit comprising:

space satellites and terrestrial stations, some of which are adapted for the purpose of transmitting paging information and some of which, are adapted for the purpose of transmitting positioning information;

ground control stations for processing the said information and controlling the actions of the paging network;

the call receiver or pager having means to resolve a global position from satellites or earth based communication means;

the system divulging to certain or all callers the global location of a callee in possession of the said call receiver white blocking such information from being divulged to certain or all other callers.

2. the ground control station of claim 1 with means to determine upon receipt of a callers message that the caller requires the global location of a callee in possession of the call receiver according to claim 1 and the said ground control station having further means to establish that a callee requires their global location disclosed.

3. The message information provided by a caller to the ground control station according to claim 2 wherein the said message comprises specific information that the said ground control station could determine that the global position of a callee in possession of the said call receiver is required.

4. The message information transmitted to a caller by the ground control station according to claim 2 comprising specific information that will describe the global location of a callee or comprising specific information that may indicate to the caller that a callee does not require their global location disclosed.

5. The ground control station of claim 1 with means to determine and request a call receiver of the paging network to disclose a global location when such information is required by the paging network.

6. The message of the ground control station of claim 5 comprising specific information that will enable a call receiver of the paging system according to claim 1 initiate the disclosure of a global position upon receipt of the said message.

7. The technique employed by the paging system of claim 1 to transmit paging information to a callee in possession of the call receiver of claim 1 comprising:

employing ground control stations to arrange or prepare a call receiver's message to include all satellites and earth based stations that will be utilized to transmit the message to the said call receiver and routing the message to the first ground transmitter;

employing the said satellites and earth stations involved in the message transmission chain to either beam the message to their coverage area or re-encode the message to eliminate the said station from the message transmission chain before redirecting the message to a subsequent satellite or earth station involved in the message transmission chain.

8. The call receiver according to claim 1 comprising:

connecting means to connect satellite signals to the satellite receiving end and terrestrial signals to the terrestrial receiving end;

satellite receiving means for receiving and processing satellite positioning and message signals and terrestrial receiving means for receiving and processing terrestrial positioning and message signals;

temporary storage means to hold either data from the satellite or terrestrial receiving circuitry while the other is being processed;

relevant means to resolve a global position from data received from either the satellite or terrestrial receiving ends.

9. The technique employed by the call receiver according to claim 8 to concurrently process satellite and terrestrial based message and positioning signals wherein either the satellite or terrestrial processing end could temporarily store their data while the other is being processed, until an appropriate time when such an action is reversed.

10. The technique employed by the call receiver of claim 8 to either block the processing of satellite or terrestrial signals while allowing such information to be processed at a later time.

11. The call receiver according to claim 8 with means to activate or deactivate the positioning disclosure feature from the paging network by transmitting specific information to the paging network that will enable the blocking of none, certain or all users to the global location of the call receiver.

12. The call receiver according to claim 8 with means to alert a user or paging network each time the said call receiver is out of its preferred or active area to receive pages and comprising the steps of:

resolving a global position from referenced satellite and earth based signals;

validating the said resolved global position with pre-selected or active areas to receive pages stored within the memory means of the said call receiver;

alerting a user each time a pre selected or active area is invalid;

updating the paging network with the resolved global position of the call receiver.

13. The information transmitted to the paging network of claim 1 by either the call receiver of claim 1 or a callee in possession of the said call receiver which contains specific information that will enable the paging network to divulge or block the global location of the said call receiver from certain or all callers.

14. The technique employed by the said call receiver of claim 1 to enable a callee in possession of the said call receiver disclose a global position when a suitable communication channel is unavailable for the said call receiver to disclose such information wherein the said call receiver periodically alerts the said callee with distinct tones until relevant information or input is received from either the said callee or paging system that such an action was undertaken.

* * * * *